United States Patent
Kaimann et al.

(10) Patent No.: US 10,563,810 B2
(45) Date of Patent: Feb. 18, 2020

(54) NON-SAG FLEXIBLE INSULATION

(71) Applicant: KAIMANN GMBH, Hövelhof (DE)

(72) Inventors: Georg Josef Kaimann, Hövelhof (DE); Ralf Springub, Münster (DE); Jürgen Georg Weidinger, Paderborn (DE)

(73) Assignee: KAIMANN GMBH, Hövelhof (DE)

( * ) Notice: Subject to any disclaimer, the term of this patent is extended or adjusted under 35 U.S.C. 154(b) by 0 days.

(21) Appl. No.: 16/300,515

(22) PCT Filed: May 10, 2017

(86) PCT No.: PCT/EP2017/061169
§ 371 (c)(1),
(2) Date: Nov. 9, 2018

(87) PCT Pub. No.: WO2017/194599
PCT Pub. Date: Nov. 16, 2017

(65) Prior Publication Data
US 2019/0162354 A1    May 30, 2019

(30) Foreign Application Priority Data
May 10, 2016   (EP) ..................................... 16168908

(51) Int. Cl.
*F16L 59/02*   (2006.01)
*C08L 23/16*   (2006.01)

(52) U.S. Cl.
CPC ............. *F16L 59/028* (2013.01); *C08L 23/16* (2013.01); *F16L 59/026* (2013.01); *F16L 59/022* (2013.01)

(58) Field of Classification Search
CPC ..... F16L 59/028; F16L 59/026; F16L 59/022; C08L 23/16
See application file for complete search history.

(56) References Cited

U.S. PATENT DOCUMENTS

2013/0291984 A1    11/2013   Himmel et al.

FOREIGN PATENT DOCUMENTS

| EP | 2 942 365 A1 | 11/2015 |
| EP | 2 947 368 A1 | 11/2015 |

(Continued)

OTHER PUBLICATIONS

EP 16168908.8, Nov. 3, 2016, Extended European Search Report.

(Continued)

*Primary Examiner* — Michael C Miggins
(74) *Attorney, Agent, or Firm* — Wolf, Greenfield & Sacks, P.C.

(57) ABSTRACT

The present invention relates to a shaped article comprising an elastomeric material, a process for making the shaped article and the use of the shaped article for forming an thermal and/or acoustic insulation, acoustic and/or vibration damping, mechanical protection and/or for applications requiring load bearing as well as a structure, such as a pipe, a pipework, a tank or a vessel, having an insulation formed from the shaped article. The shaped article has a planar form with two main sides and a plurality of tapered recesses formed in one of the main sides. The tapered recesses form each a pointed angle and the sum of the pointed angles of all tapered recesses is 300 to 355 degrees. The protrusion of the recesses into the form is more than 20% but not more than 80% of the thickness of the planar form. The shaped articles comprises an expanded and crosslinked elastomeric material, the elastomeric material comprising at least one crosslinked elastomer polymer (A) and at least one crosslinked resin (B), wherein the at least one elastomer polymer (A) and the at least one resin (B) form an interpenetrating network.

18 Claims, 6 Drawing Sheets

(56) References Cited

FOREIGN PATENT DOCUMENTS

| | | |
|---|---|---|
| FR | 2 582 078 A1 | 11/1986 |
| GB | 2 442 240 A | 4/2008 |
| WO | WO 2014/201456 A1 | 12/2014 |

OTHER PUBLICATIONS

PCT/EP2017/061169, Jul. 13, 2017, International Search Report and Written Opinion.
PCT/EP2017/061169, May 22, 2018, International Preliminary Report on Patentability (Chapter II).
Extended European Search Report for EP App. No. 16168908.8 dated Nov. 3, 2016. 8 pages.
International Search Report and Written Opinion for PCT/EP2017/061169 dated Jul. 13, 2017. 10 pages.
International Preliminary Report on Patentability (Chapter II) for PCT/EP2017/061169 dated May 22, 2018. 6 pages.

NON-SAG FLEXIBLE INSULATION

CROSS REFERENCE TO RELATED APPLICATIONS

This application is a national stage filing under 35 U.S.C. § 371 of International Application No. PCT/EP2017/061169, filed May 10, 2017, entitled "Non-Sag Flexible Insulation," which claims the benefit of and priority to European Application No. EP16168908.8, filed May 10, 2016, each of which is incorporated herein by reference in its entirety for all purposes.

FIELD OF THE INVENTION

The present invention relates to a shaped article comprising an elastomeric material, a process for making the shaped article and the use of the shaped article for forming a thermal and/or acoustic insulation, acoustic and/or vibration damping, mechanical protection and/or for applications requiring load bearing as well as a structure, such as a pipe, a pipework, a tank or a vessel, with an insulation formed from the shaped article.

TECHNICAL BACKGROUND

Insulation materials exhibit a broad range of raw material bases, from fibers to plastic foams, expanded resinous materials, bond hollow particles etc. Elastomeric or rubber based insulation (FEF, factory made elastomeric foam, e.g. according to EN 14304) is preferred among insulation materials, especially when it comes to insulate complex geometries and/or when talking about (at least partially) cold installations. This is due to its flexibility on the one hand and its in-built vapor barrier properties on the other hand. Its flexibility, however, is also one of its major drawbacks as is shown in more detail below.

Other materials exhibiting less flexibility, such as thermoplastic or resin foams, but also fiber based insulation, are not easy to be applied on round shaped installations due to their rigidity. They lead to gaps or air inclusions, which are undesirable due to poor energy efficiency, noise reduction and condensation prevention reasons. Condensed water may cause erosion of the structure. As such an insulation material itself is not or not sufficiently compressible, gaps are very likely already by production tolerances of the insulation mat itself, but also of the installation to be insulated, leading to some millimeters of deviation per centimeter of metal pipe diameter already (see e.g. EN 10216 and EN 13480).

However, tightly mounted insulation is required almost everywhere, but can, so far, only be provided by (properly) using flexible insulation (FEF). For smaller pipes such materials may be appropriate, but problems occur when it comes to larger installations: the flexible and, thus, soft material will sag when mounted horizontally and collapse when loaded with weight vertically. In any case the danger of losing the structural integrity of the insulation system is significant and may lead to poor energy efficiency, noise reduction and condensation prevention reasons. Applying strips or belts as supports is costly and does not provide sufficient safety.

Problem to be Solved by the Invention

It is thus an object of the present invention to provide a material reducing or overcoming the deficiencies of the prior art mentioned above. It is a preferred object that the material provides structural integrity, thus being self-supporting, even when used in high insulation thicknesses and on large diameter installations, same time exhibiting sufficient flexibility and compressibility to safely close possible gaps and to allow tight and reliable, but easy installation. Further objects are providing a process for manufacturing the material, a use of the material and a structure with an insulation formed from the material.

SUMMARY OF THE INVENTION

The above object is solved by the shaped article, the process for making the shaped article, the use of the shaped article and a structure with an insulation formed from the shaped article according to the independent claims.

In more detail, the object is, in particular, solved by the following items:

1. A shaped article having a planar form with two main sides and a plurality of tapered recesses formed in one of the main sides,
   wherein the tapered recesses form each a pointed angle and the sum of the pointed angles of all tapered recesses is 300 to 355 degrees and the protrusion of the recesses into the form is more than 20% but not more than 80% of the thickness of the planar form, and
   wherein the shaped article comprises or consists of an expanded and crosslinked elastomeric material, the elastomeric material comprising at least one crosslinked elastomer polymer (A) and at least one crosslinked resin (B),
   wherein the at least one elastomer polymer (A) and the at least one resin (B) form an interpenetrating network.
2. The shaped article according to item 1, wherein the recesses have an average angle in the range of 2° to 45°, preferably 5° to 40°, more preferably 7.5° to 30°.
3. The shaped article according to item 1 or 2, wherein the protrusion of the recesses into the form is 25% or more and 70% or less, preferably 30% or more and 60% or less, more preferably 30% or more and 55% or less, of the thickness of the planar form.
4. The shaped article according to any one of items 1 to 3,
   wherein the recesses have the same or almost the same protrusion, preferably the same protrusion, and/or
   wherein the recesses are arranged in parallel or almost in parallel, preferably in parallel, and/or
   wherein the recesses run across the main side of the shaped article from one edge to another edge, preferably an opposite edge.
5. The shaped article according to any one of items 1 to 4, wherein the elastomeric material contains 1 to 100 phr, preferably 3 to 75 phr, more preferably 5 to 60 phr, of resin (B), based on 100 phr of elastomeric polymer (A).
6. The shaped article according to any one of items 1 to 5, wherein the resin (B) is a (co)polymer at least including structural units derived from one or more compounds selected from acrylic acid, acrylic acid esters, methacrylic acid and methacrylic acid esters.
7. The shaped article according to any one of items 1 to 6, wherein the elastomer polymer (A) is one, two or more of the group consisting of acrylic rubber (ACM/AEM), polyurethane ester/ether rubber (AU/EU), butadiene rubber (BR), bromobutyl rubber (BIIR), chlorobutyl rubber (CIIR), chlorinated polyethylene rubber (CM), polychloroprene rubber (CR), chlorosulfonated polyethylene rubber (CSM), chlorosulfonated polychloroprene rubber (CSR), ethylene oxide/epichlorohydrine rubber (G)(E)CO, ethylene propylene copolymer (EPM), ethylene propylene terpolymer (EPM/EPDM), ethylene vinyl acetate rubber (EVM), fluoro rubber (FPM/FKM), fluorocarbon (ethylene) rubber (F(E) PM), propylene oxide rubber (GPO), polyisoprene (IR), butyl rubber (IIR), silicone rubber (F)(P)(V)MQ, acrylonitrile butadiene rubber (NBR), hydrogenated acrylonitrile butadiene rubber (HNBR), natural rubber (NR), styrene butadiene rubber (SBR), styrene acrylonitrile thermoplastic rubber (SAN), styrene ethylene butadiene thermoplastic rubber (SEBS), polysulphide rubber (T), urethane thermoplastic rubber (TPU) or any mixture thereof.

8. The shaped article according to any one of items 1 to 7, wherein the elastomeric material has a compressive strength according to EN 826 of 45 kPa or more and less than 300 kPa, preferably 50 kPa or more and 150 kPa or less, more preferably 55 kPa or more and 100 kPa or less, at 25% compression.

9. The shaped article according to any one of items 1 to 8, wherein the elastomeric material is a closed or an open cell foam, preferably a closed cell foam with a closed cell content of at least 70%.

10. The shaped article according to any one of items 1 to 9, wherein the elastomeric material has a density according to ISO 845 of less than 300 kg/m$^3$, preferably less than 200 kg/m$^3$, more preferably less than 150 kg/m$^3$, and a thermal conductivity according to EN 12667 of less than 0.050 W/mK at 0° C., preferably less than 0.045 W/mK at 0° C., more preferably less than 0.040 W/mK at 0° C.

11. The shaped article according to any one of items 1 to 10, wherein the elastomeric material exhibits a water vapor diffusion barrier property according to EN 12086 of at least µ 2000, preferably at least µ 3000, more preferably at least µ 5000.

12. The shaped article according to any one of items 1 to 11, wherein the elastomeric material further comprises at least one thermoplastic polymer (E), which is preferably selected form a group consisting of ABS, PE, PEEK, PEI, PET, PI, POM, PP, PS, PU, PVC, PTFE, PVDF or any combination thereof, more preferably from PVC, PE, PS, ABS or any combination thereof.

13. The shaped article according to item 12, wherein the thermoplastic polymer (E) is present in the elastomeric material in an amount 5 to 250 phr, preferably 15 to 100 phr.

14. The shaped article according to any one of items 1 to 13, wherein the elastomeric material further comprises at least one filler (F).

15. The shaped article according to item 14, wherein the filler (F) is present in the elastomeric material in an amount of 5 to 600 phr, preferably 20 to 350 phr.

16. The shaped article according to any one of items 1 to 15, wherein the tapered recesses have a V shape or a deformed V shape, the deformed V shape having preferably at least one of the following features:
   curved side walls, and
   side walls having different angles to a plane extending perpendicularly to the plane of the planar form.

17. The shaped article according to any one of items 1 to 16, wherein the shaped article has step structures on one, two or more of its edges to provide an overlap when mounting the shaped article and/or structures on one, two or more of its edges that are designed for mechanically interlocking the edges together, for example by mechanical male/female or click connection.

18. A process for manufacturing the shaped article according to any of items 1 to 17 comprising the steps:
(1) preparing a polymer composition by mixing at least the following components:
   at least one elastomeric polymer (A'),
   at least one least one crosslinkable resin (B'),
   a crosslinking agent (C), and
   an expanding agent (D);
(2) crosslinking and expanding the polymer composition to form an expanded and crosslinked elastomeric material, wherein the elastomeric materials has at least one crosslinked elastomer polymer (A) and at least one crosslinked resin (B), which form an interpenetrating network, and bringing it into a planar form with two main sides; and
(3) forming a plurality of tapered recesses in one of the main sides, wherein the tapered recesses form each a pointed angle and the sum of the pointed angles of all tapered recesses is 300 to 355 degrees and the protrusion of the recesses into the form is more than 20% but not more than 80% of the thickness of the planar form.

19. The process for manufacturing the shaped article according to item 18, wherein the at least one crosslinkable resin (B') is an oligomer or (co)polymer at least including structural units derived from one or more compounds selected from acrylic acid, acrylic acid esters, methacrylic acid and methacrylic acid esters,
   the at least one resin crosslinkable (B') may optionally have one or more unsaturated double bonds in the main chain or in a side chain thereof, the at least one crosslinkable resin (B') has preferably a number average molecular weight of $10^3$ to $10^7$, and/or the at least one crosslinkable resin (B') is preferably crosslinkable at temperatures above 120° C. and/or is preferably softening at temperatures above 80° C., which means a decrease in viscosity of more than 15% at 80° C.

20. Use of the shaped article as defined in any one of items 1 to 17 for forming an thermal and/or acoustic insulation, acoustic and/or vibration damping, mechanical protection and/or for applications requiring load bearing.

21. The use according to item 20, wherein the shaped article is used
   for forming an insulation of a pipe, a pipe support and/or a pipe hanger,
   for wrapping around pipework or a vessel,
   for making prefabricated parts for equipment insulation, such as insulation shells for valves, flanges and fittings, or
   for thermal and/or acoustic insulation of installations underwater, underground or underneath screed or concrete.

22. A structure with an insulation, wherein the insulation is obtainable by arranging the shaped article as defined in any one of items 1 to 17 around the structure, such as a pipe, a pipework, a tank or a vessel, so that the recesses are at least partially closed and the elastomeric material partially compressed.

DETAILED DESCRIPTION OF THE INVENTION

One aspect of the present invention relates to a shaped article. The shaped article has a planar form with two main sides and a plurality of tapered recesses formed in one of the main sides,
wherein the tapered recesses form each a pointed angle and the sum of the pointed angles of all tapered recesses is 300 to 355 degrees and the protrusion of the recesses into the form is more than 20% but not more than 80% of the thickness of the planar form, and
wherein the shaped articles comprises or consists of an expanded and crosslinked elastomeric material, the elastomeric material comprising at least one crosslinked elastomer polymer (A) and at least one crosslinked resin (B),
wherein the at least one crosslinked elastomer polymer (A) and the at least one crosslinked resin (B) form an interpenetrating network.

The inventors have surprisingly found that the shaped article of the present invention solves the above object. The expanded and crosslinked elastomeric material (herein also denoted as "elastomeric material") is a unique composite material and exhibits the advantages of both components, namely the crosslinked (vulcanized) elastomer polymer (A) and the resinous network.

The elastomeric material is more rigid and exhibits higher structural integrity than ordinary elastomeric foams, but it is still compressible and flexible in comparison to rigid foams or a fibrous insulation mat. The inventors consider the elastomeric material to be a semi-rigid elastomeric foam, as it is self-supporting as rigid materials and yet shows elastomeric properties of the elastomer polymers (A). They surprisingly found that the elastomeric material can bear significant loads and is thus more suitable for the insulation of larger installations than ordinary flexible (FEF) materials. Due to the reinforcing and rigidity increasing effect of the resinous network in the elastomeric material, an insulation made of the shaped article does not sag when mounted horizontally or collapse when loaded with weight vertically. On the contrary, it maintains its structural integrity, so that the formation of gaps is avoided. It thus leads to enhanced energy efficiency, improved noise reduction and better prevention of condensation in comparison to ordinary flexible (FEF) materials.

Moreover, as the rubber properties of the network of crosslinked elastomer polymer (A) are maintained in the elastomeric material, the shaped article can be installed more easily than ordinary rigid insulation materials, such as thermoplastic or resin foams (e.g. polystyrene foams) or fiber-based materials. In addition, as it is compressible, it can be installed more tightly around structures, which allows for the above-mentioned advantages.

In the elastomeric material of the shaped article, the network of the crosslinked elastomer polymer (A) accounts for the elastomeric properties, flexibility and compressibility. Moreover, the inventors surprisingly found that low thermal conductivity and excellent water vapor diffusion barrier properties are achieved by the semi-rigid elastomeric material of the shaped article, which were previously only known form flexible (FEF) foam materials, which lack sufficient rigidity and structural integrity. Thus, the elastomeric material of the shaped article unifies the excellent insulation properties of ordinary flexible, elastomeric foams with sufficient rigidity, compressibility and load-bearing properties.

As mentioned above, the resinous network formed by the crosslinked resin (B) improves mechanical and thermal stability and rigidity of the elastomeric material. The elastomeric material and the shaped article, respectively, show structural integrity and are self-supporting. In the interpenetrating network of the elastomeric material, the network of crosslinked (vulcanized) elastomer polymer (A) and the network of crosslinked resin (B) are preferably crosslinked with each other, which can further improve the mechanical properties of the elastomeric material and thus of the shaped article.

Figure 1:
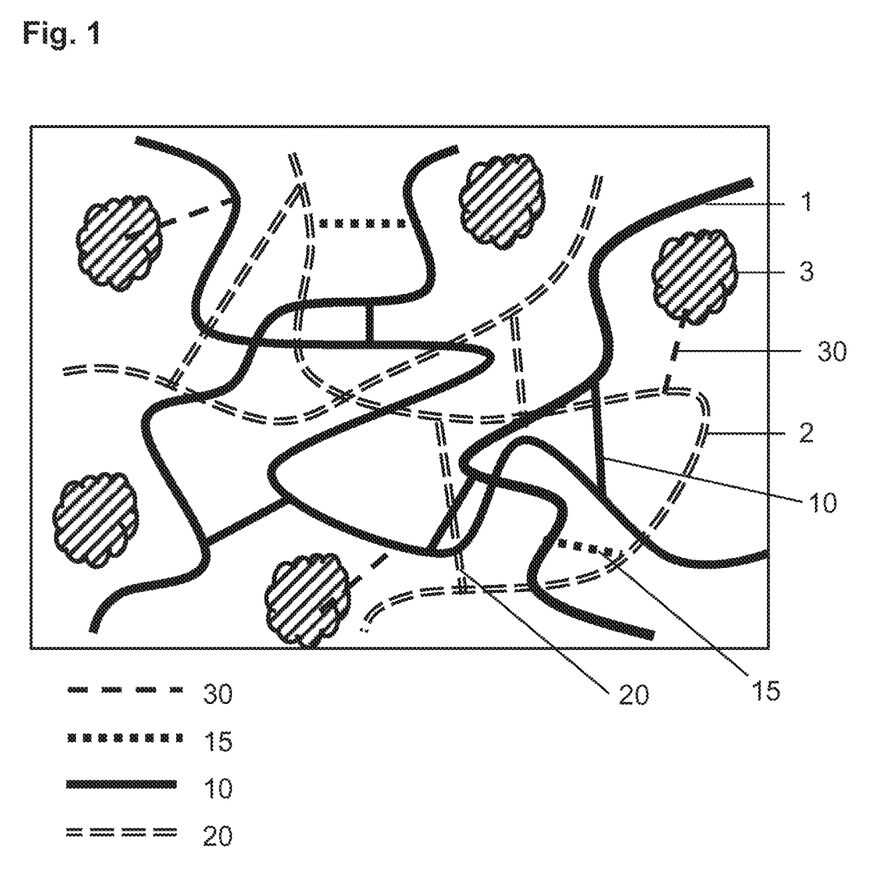
FIG. 1 is a schematic cross-sectional view of a presumed composite structure of the elastomeric material of a shaped article according to an embodiment of the present invention.

For illustration, FIG. 1 shows a schematic cross-sectional view of the elastomeric material of the shaped article according to one embodiment of the present invention. For the sake of clarity, cells formed during expansion are omitted. The crosslinked (vulcanized) elastomer polymers (1) form a network. Crosslinks between the elastomer polymer strands (10) are present. The resin (2) has crosslinks (20) and forms a secondary network within the vulcanized elastomer (rubber) matrix, so that an interpenetrating network is obtained. The secondary network is rigid by definition, as it is resinous. The crosslinked resin may be standalone network or it is linked (15) to the rubber network. Fillers (3) may be present and, for example, be linked to the resin (30) as illustrated in FIG. 1. Hence, FIG. 1 shows the interpenetration of the rubber polymer network and the resinous network and the bonding varieties.

The excellent material properties of the elastomeric material further allow for precise formation of tapered recesses in one of the main sides of the shaped article. The recesses can e.g. be formed by cutting, milling or erosion. Such processes are not suitable for conventional elastomeric foams, because they are too soft and would be ripped in or torn apart. The above-mentioned conventional rigid materials are often too brittle and too stiff, so that the formation of precise recesses is difficult as well.

In the shaped article, the tapered recesses are formed, so that they each form a pointed angle. The sum of the pointed angles of all tapered recesses is 300 to 355 degrees and thus less than 360 degrees. The width of the tapered recesses is continuously narrowing down from the surface to the inner part of the elastomeric material. The pointed angle is measured at the narrowest point of the recess using a precise goniometer. The pointed angle is defined by the side walls of the recesses. In case a recess is formed at the edge of the material, so that it only has one side wall, a virtual plane, which is perpendicular to the main side having the recesses of the planar form and goes to the narrowest point of the recess, is used a virtual side wall for determining the pointed angle. Herein, pointed angle means an angle of less than 90°. Preferably, the recesses have an average angle in the range of 2° to 45°, preferably 5° to 40°, more preferably 7.5° to 30°.

The sum of the pointed angles of the recesses being 300° to 355° ensures that the elastomeric material of the shaped article undergoes a slight compression when being mounted around an installation. Due to the compression, gaps caused by tolerances of the installation or the insulation material can be actively closed by the elastomeric material of the shaped article, so that a particularly tight insulation can be assured.

A total of 360 degrees would mean that an insulation being wrapped around an installation would be without gaps and tightly applied only if there would be no tolerances of the (metal) installation itself, no tolerances in the insulation materials and no tolerances in the recesses dimensions. This is neither realistic nor achievable in an economically reasonable manner. However, the use of the unique shaped article of the present invention having a compressible, semi-rigid elastomeric material and its specific shape with tapered recesses allows for the first to time to obtain a self-supporting, but at same time condensation-tight (and sound tight) and minimized thermal bridging insulation.

The recesses are configured in a way that they protrude into the planar form by more than 20% and maximum 80% of its thickness, preferably by 25% or more and 70% or less, more preferably 30% or more and 60% or less, even more preferably 30% or more and 55% or less. This is to prevent that closing the recesses by wrapping the shaped article around an installation would lead to distortion of its outer surface. By leaving at least 20% of the thickness without recesses, a round and smooth surface is obtained. Preferably, the recesses have the same or almost the same protrusion into the form. Almost the same protrusion means that they deviate by less than 15%, preferably 10% or less and more preferably 5% or less, from the average protrusion, as determined by a cross section of the shaped article without magnification. Preferably, the recesses are arranged in parallel or almost parallel. Almost parallel means that they deviate by less than 10%, preferably less than 5%, from the main direction (average value). It is most preferred that the recesses are arranged in parallel. Furthermore, the recesses can run across the main side of the shaped article from one edge to another edge, preferably the opposite edge, of the shaped article.

Moreover, due to the recesses and the mechanical properties of the elastomeric material, the shaped article can be easily installed to form an insulation. It can be simply arranged or wrapped around an installation and then fixed with an adhesive or by mechanically interlocking the ends of the shaped article. No strips or belts are required as for conventional flexible insulation (FEF) or as for fixing rigid insulation part, e.g. half shells. Thus, the shaped article enables faster and more economic formation of insulations. In addition, since gaps are actively closed by the compressible, semi-rigid elastomeric material of the shaped article, it can be easily applied even on critical mounting sites without special training or education and still will provide safe and sustainable insulation. It is thus able to balance tolerances and can therefore ensure a condensation tight insulation.

It is an additional advantage of the shaped article that it can be stored and transported in its planar form and is therefore extremely space-saving in comparison to readily round preforms (shells and half shells).

For the reasons mentioned above, the unique shaped article of the present invention is particularly suitable for a variety of applications, including thermal and/or acoustic insulation and/or acoustic and/or vibration damping and/or mechanical protection. It is fast and easily mounted and ensures tight insulation.

In the elastomeric material, the total weight of all rubber polymers (elastomer polymers) represents a base of 100 parts, on which all other ingredients are calculated and indicated in phr (phr=parts per hundred parts of rubber polymer).

The elastomeric material can contain 1 to 100 phr, preferably 3 to 75 phr, more preferably 5 to 60 phr, of resin (B), based on 100 phr of elastomeric polymer (A). In case the content of resin (B) is too small, the resinous network is either not formed or rigidity of the material is too low. On the other hand, if the content of resin (B) is too high, compressibility of the elastomeric material is reduced, so that the shaped article cannot be installed properly around structures to be insulated. Herein, resin (B) is different from the elastomer polymer (A).

The resin (B) in the sense of this invention is polymeric material showing a three-dimensional network of covalent bonds which is obtained from monomeric building blocks, such as urethanes, melamine, (iso)cyanurates, (meth)acrylics, phenolics. The resin (B) of the resinous network can thus be polyurethanes, poly(iso)cyanurates, polyphenolics, poly(meth)acrylics including esters or salts thereof, polyesters, polyethers and epoxides. Preferably, the resin (B) is a polymer or copolymer at least including structural units derived from one or more compounds selected from acrylic acid, acrylic acid esters, methacrylic acid and methacrylic acid esters.

In the elastomeric material, the crosslinked elastomer polymer (A) forming the elastomeric network is formed from one or more rubber polymers (i.e. elastomer polymers) by crosslinking such as standard vulcanization. The underlying elastomeric polymers may either be normal elastomeric or thermoplastic elastomeric polymers (A). Herein (A) denotes the crosslinked (vulcanized) elastomer polymer being part of the interpenetrating network and (A') the corresponding precursor, which may or may not have crosslinks. For example, the elastomer polymer (A) or (A'), respectively, can be one, two or more of the group consisting of acrylic rubber (ACM/AEM), polyurethane ester/ether rubber (AU/EU), butadiene rubber (BR), bromobutyl rubber (BIIR), chlorobutyl rubber (CIIR), chlorinated polyethylene rubber (CM), polychloroprene rubber (CR), chlorosulfonated polyethylene rubber (CSM), chlorosulfonated polychloroprene rubber (CSR), ethylene oxide/epichlorohydrine rubber (G)(E)CO, ethylene propylene copolymer (EPM), ethylene propylene terpolymer (EPM/EPDM), ethylene vinyl acetate rubber (EVM), fluoro rubber (FPM/FKM), fluorocarbon (ethylene) rubber (F(E)PM), propylene oxide rubber (GPO), polyisoprene (IR), butyl rubber (IIR), silicone rubber (F)(P)(V)MQ, acrylonitrile butadiene rubber (NBR), hydrogenated acrylonitrile butadiene rubber (HNBR), natural rubber (NR), styrene butadiene rubber (SBR), styrene acrylonitrile thermoplastic rubber (SAN), styrene ethylene butadiene thermoplastic rubber (SEBS), polysulphide rubber (T), urethane thermoplastic rubber (TPU) or any combination thereof.

Preferred elastomeric polymers (A) and (A'), respectively, are such having an unsaturated bond in the backbone and/or in a side chain (such as NBR, SBR, EPDM, BR, IIR) and/or an active site that can be crosslinked using metal oxides (such as CR) and/or peroxides (such as EVM, CM, VMQ). Hence, the elastomer polymer (A) and (A'), respectively, is preferably one, two or more of the group consisting of NBR, SBR, EPDM, BR, IIR, CR, EVM, VMQ or any combination thereof. Especially preferred are elastomeric polymers that can be crosslinked using sulphur based vulcanization agents or vulcanization compositions (systems), such as NBR, SBR, EPDM, BR, IIR or any combination thereof.

As mentioned above, due to the interpenetrating network of elastomer polymer (A) and resin (B), the material has semi-rigid properties. For insulation applications of the shaped article of the present invention, the compressibility of the elastomeric material is important. If the compressibility is too high, the material is not rigid enough and thus not self-supporting, which can lead to instable, sagging or collapsing structures. Formation of precise recesses is then difficult if not impossible. If the compressibility is too low, e.g. as in conventional rigid insulation materials, the elastomeric properties are deteriorated and problems with tightness and insulation properties may occur.

The elastomeric material of the shaped article can have a compressive strength according to EN 826 of 45 kPa or more and less than 300 kPa, preferably 50 kPa or more and 150 kPa or less, more preferably 55 kPa or more and 100 kPa or less, at 25% compression. Furthermore, the elastomeric material may have a compression set of less than 50% under 25% compression at 60° C. for 24 hours according to ISO 815 (elasticity criterion).

In order to attain good insulation properties the elastomeric material of the shaped article is foamed. It can be present in as a closed cell foam or an open cell foam. Whether closed or open (continuous) cells are formed can be regulated by the process conditions used for expanding the material. Such processes or process conditions belong to the skilled person's general knowledge and are thus not described in detail herein. Since closed cell foams have better insulating properties, the elastomeric material is preferably a closed cell foam, which may have a closed cell content of at least 70% (numerical value).

The density of the elastomeric material and thus of the shaped article can be adjusted by using appropriate amounts of expanding agent, appropriate process conditions and the type of polymer. The elastomeric material has preferably a density according to ISO 845 of less than 300 kg/m$^3$, preferably less than 200 kg/m$^3$, more preferably less than 150 kg/m$^3$.

First of all by adjusting the density and the content of closed cells in the expanded elastomeric material, the thermal conductivity of the elastomeric material can be set. The thermal conductivity of the elastomeric material according to EN 12667 is preferably less than 0.050 W/mK at 0° C., preferably less than 0.045 W/mK at 0° C., more preferably less than 0.040 W/mK at 0° C.

Just like conventional foams of elastomer polymers, the semi-rigid elastomeric material of the shaped article according to present invention shows excellent water vapor barrier properties, which enables in combination with the specific shape and the compressibility of the elastomeric material very good condensation tight insulations. The elastomeric material and thus the shaped article can exhibit a water vapor diffusion barrier property according to EN 12086 of at least μ 2000, preferably at least μ 3000, more preferably at least μ 5000.

It is particularly preferred, when the elastomeric material and, accordingly the shaped article, show a combination of the above described compressive strength, thermal conductivity and water vapor diffusion barrier property. In the shaped article and the elastomeric material, respectively, according to the present invention, all these desirable properties can be realized at the same time, which is unique among insulation materials and allows for forming recesses and accounts for simplified installation, improved security and enhanced insulation properties.

The elastomeric material may further comprise a compound (E), which is at least one thermoplastic polymer. The thermoplastic polymer is different from elastomer polymers (A) and resin (B). The thermoplastic polymer is preferably selected form a group consisting of ABS, PE, PEEK, PEI, PET, PI, POM, PP, PS, PU, PVC, PTFE, PVDF or any combination thereof. Preferably, the thermoplastic polymer is selected from PVC, PE, PS, ABS or any combination thereof. The thermoplastic polymer can be added in order to reduce the material costs, to improve the processing and surface properties (e.g. smoothness, paintability, friction) and to increase the green strength of the elastomeric material. The thermoplastic polymer can be present in the elastomeric material in an amount 5 to 250 phr, preferably 15 to 100 phr. The thermoplastic polymer (E) does not form a network.

The elastomeric material may further comprise at least one filler (F). Typical fillers for elastomer foams may be used. Examples can be selected from inorganic (metal or half metal) chalkogenides, carbonates, halogenides, hydroxides, hydrates, silica, carbon black, synthetic particles (such as glass or ceramic plates, tubes or spheres etc.) and particles of a ground elastomeric material of the present invention. The filler (F) can be present in the elastomeric material in an amount of 5 to 600 phr, preferably 20 to 350 phr. For the particles of an elastomeric material of the present invention, the material obtained from forming the tapered recesses can be used, which is preferable in terms of economic and ecological aspects.

The elastomeric material may comprise one, two or more further ingredients (G) such as flame retardants and synergists, biocides, plasticizers, stabilizers (e.g. versus heat, UV, ozone, depolymerization/reversion etc.), colors, additives, which are commonly used for foams of elastomeric polymers. They may be use in any ratio. In particular, additives for improving the manufacturing, application, aspect and performance properties of the elastomeric material may be used. Examples are inhibitors, retarders, accelerators; and/or additives for adapting it to the needs of the application, such as char-forming and/or intumescent additives, like phosphorous compounds, expanding vermiculite, perlite, graphite, to render the material self-intumescent in case of fire, e.g. for general protection purposes and/or to close and protect e.g. wall and bulkhead penetrations; and/or substances that will lead to a self-ceramifying effect to pipes, wall penetrations in case of fire, such as boron compounds, silicon containing compounds and/or internal adhesion promoters to ensure self-adhesive properties in co-extrusion and co-lamination applications, such as silicate esters, functional silanes, polyols; and/or additives that act as internal adhesion promoters to ensure self-adhesive properties in co-extrusion and co-lamination applications, such as silicate esters, functional silanes, polyols.

The elastomeric material may also comprise fibers (H) as long fibers, chopped fibers or pulp as both filler material and reinforcing agent, such as glass fibers, polyaramide fibers, polyester fibers and any combination thereof.

As regards the structure of the tapered recesses, they are formed as such that the shaped article can be easily rounded and/or wrapped around a structure, such as pipework, a vessel or a tank, and a slight compression of the elastomeric material is ensured. Preferably, the recesses are completely closed (not considering the cells in the foam) when the shaped article is mounted around a structure.

For example, the tapered recesses can have a V shape or a deformed V shape. In the V-shape, the side walls are straight and have on both sides of the recess the same length. In the deformed V shape, the recesses have preferably at least one of the following features:
  curved side walls, such as bow-shaped walls so that a cross-section thereof has a shovel-like or sickle-like shape, and/or
  side walls having different lengths, so that a cross-section thereof has a saw-tooth-like shape.

As mentioned above, the recesses form each a pointed angle. Structures having different angles, such as step structures, or structures, which are suitable for mechanically interlocking the shaped article (see below), are not considered to be tapered recesses herein.

The remaining surface of the main side having tapered recesses may further show grooves or cuts, which can be beneficial for thermal or acoustic decoupling. These grooves and cuts do not resemble tapered recesses and do not exceed a protrusion of 10% of the thickness of the planar form.

Figure 2A:
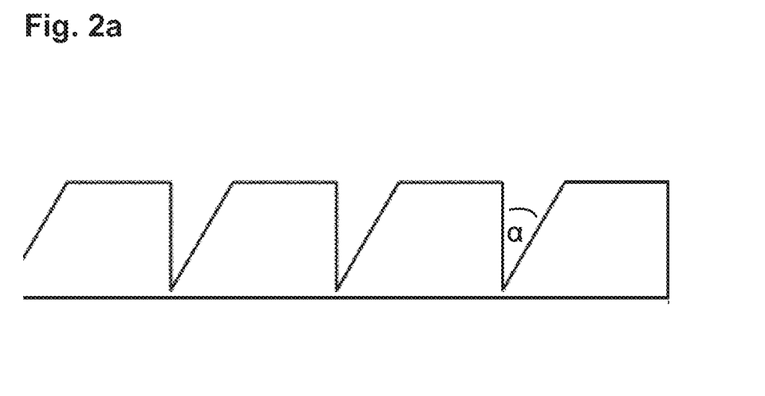
FIG. 2 is a schematic cross-sectional drawing of some embodiments of the recesses and the shaped article of the present invention.
Figure 2B:
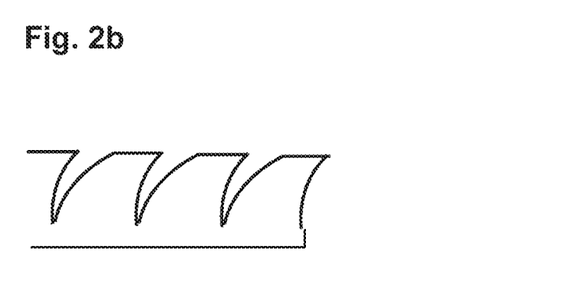
Figure 2C:
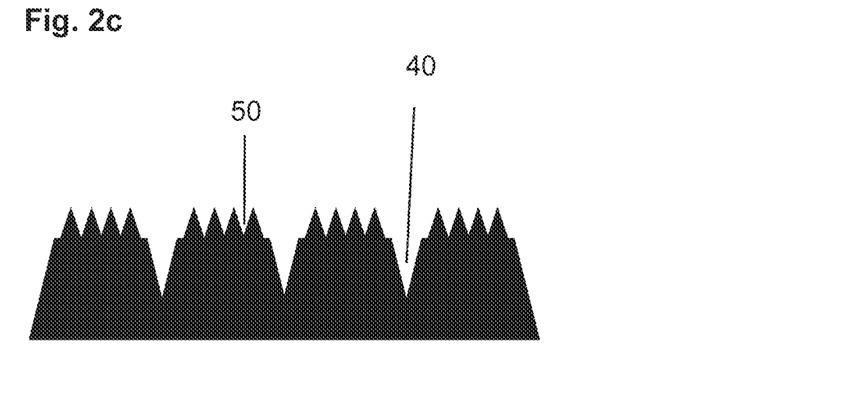

In FIG. 2, schematic cross-sectional views of a few embodiments of tapered recesses are illustrated. The protrusion of the recesses into the shaped article might not be illustrated true to scale. In FIG. 2a, recesses having a deformed V shape are shown. The pointed angle ($\alpha$) is indicated in one of the recesses. The side walls are straight but have a different length, so that a saw-tooth-like shaped is obtained. FIG. 2b shows recesses of another deformed V shape having curved or bow-shaped sidewalls of different length. In FIG. 2c, (regular) V shaped recesses (40) are shown. They have straight side walls of the same length. The shaped article further contains cuts or grooves (50) on the same main side, which are not counted to the tapered recesses herein.

Furthermore, the shaped article may have step structures on one, two or more of its edges to provide an overlap when mounting shaped articles to each other or attaching the ends of a shaped article together. In addition or alternatively, the shape article may have structures on at least one, two or more of its edges that are designed for mechanically interlocking the edges together. Since the elastic material combines flexibility (i.e. no brittleness) and rigidity (i.e. structural integrity), the structures for mechanically interlocking the edges may be fastened and opened repeatedly, which facilitates maintenance and reparation of the insulated installation and allows for reusing the insulation material. Examples may be mechanical male/female or so-called "click" connections.

According to a further embodiment, one or more additional layers (I) may be present. The additional layers (I) may be an additional foam or sponge material, protective cladding, decorative coatings, and foils and may be applied both on the outer or inner (having the tapered recesses) main surface of the shaped article. Preferably, they are connected to the shaped article on the main side that is opposite to main side having the tapered recesses.

Figure 3A:
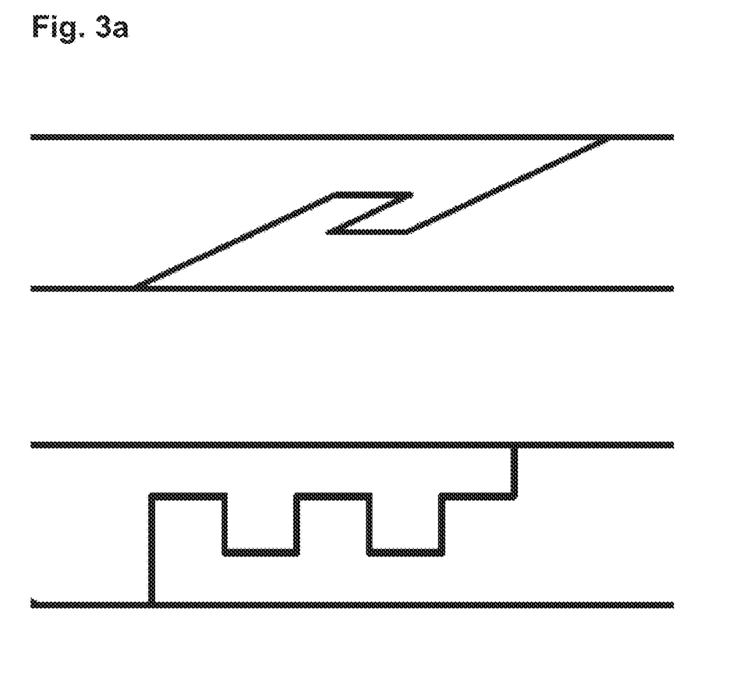
FIG. 3 is a schematic cross-sectional drawing illustrating edges of preferred embodiments of the shaped article for connecting it to itself.

The shaped article can be arranged, wrapped or rolled around structures or installations in one or more layers. It can be glued with standard adhesives available for rubber gluing to close the seams. To facilitate adhesion and to increase safety in mounting (prolongation of water/humidity ingress path) the shaped article can be furnished with steps at its ends or edges as outlined above. In FIG. 3a, two embodiments of such steps are illustrated. A glue or adhesive may e.g. be applied along the steps.

Figure 3B:
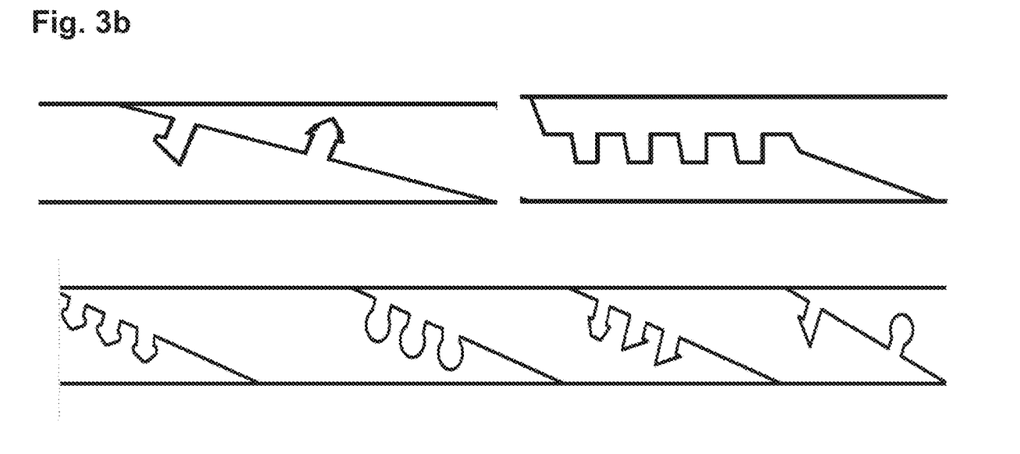

Furthermore, due to its ideal combination of flexibility (=no brittleness) and rigidity (=safe fastening) the elastomeric material and thus the shaped article may also be merged to each other mechanically. FIG. 3b illustrates several structures for mechanically interlocking the edges by male/female or click connections.

The thickness of the shaped article and, accordingly, of the resulting insulation, is not particularly limited. All thicknesses, which are typical for the applications discussed herein, can be produced by standard procedures.

Figure 4:
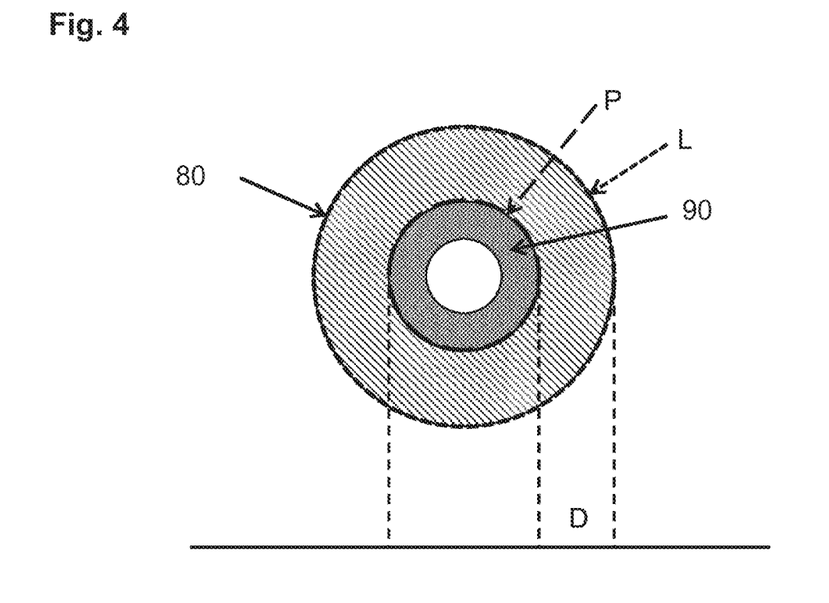
FIGS. 4 and 5a are schematic cross-sectional views of an embodiment of the shaped article of the present invention to demonstrate the dimensioning of the shaped article.

FIG. 4 shows a schematic cross-sectional view of a structure, such as a pipe (90), having an insulation (80) formed from the shaped article. The elastomeric material can be cut into a pre-defined length L to obtain a suitable shaped article for pipe (90). The length L of the shaped article is selected depending on the perimeter P of the round installation or pipe (90) to be insulated with an insulation (80) having a thickness D in a way that the length L is (P+2$\pi$D), which is representing the outer perimeter of the insulation (80) after mounting.

Figure 5A:
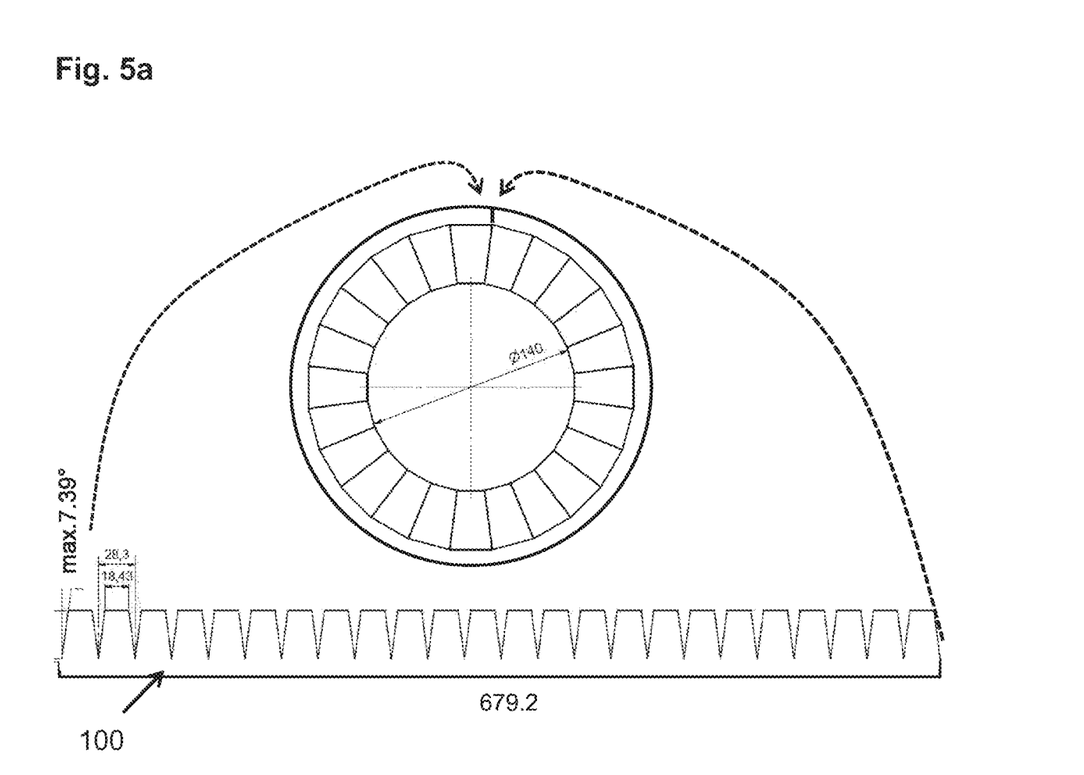

FIG. 5a shows in a schematic cross-sectional view of a shaped article (100) according to an embodiment of the present invention in its planar form. In this embodiment, the shaped article (100) has V shaped tapered recesses. On the left hand side, a virtual plane is indicated to determine the pointed angle on the side of the shaped article (100). As shown in FIG. 5a, the shaped article can be arranged around a structure and then be fixed using a glue and/or step structures or structures for mechanical interlocking of the edges. In the state shown in top section of FIG. 5a, the recesses are closed and the elastomeric material is partially compressed, so that gaps are closed and a particularly tight insulation is achieved.

Figure 5B:
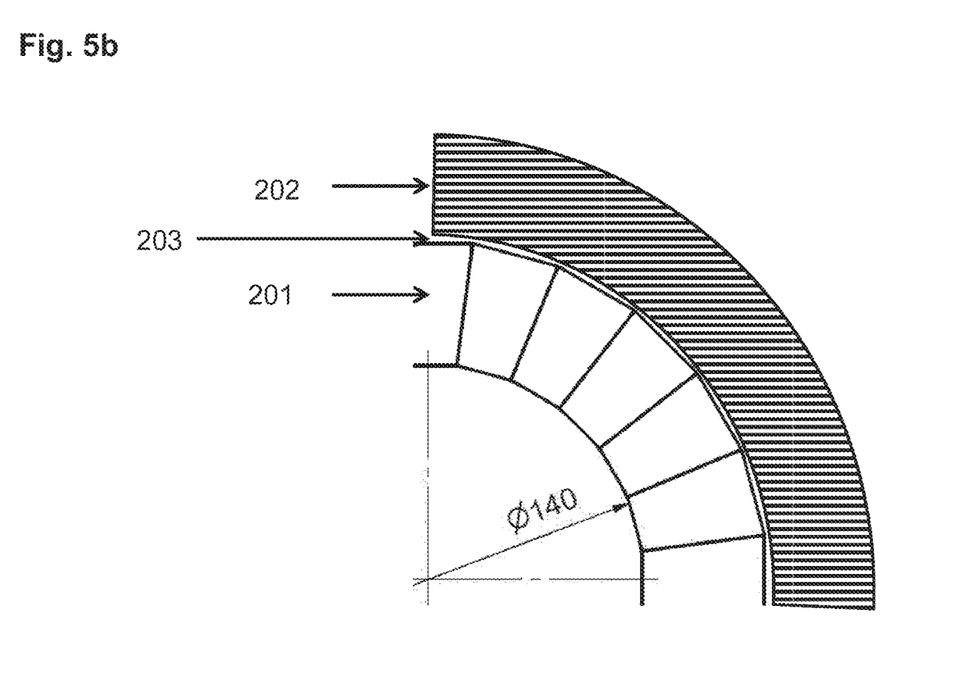
FIG. 5b shows schematic cross-sectional view of an unpreferred insulation.

The recesses are configured in a way that they protrude into the planar material by more than 20% and maximum 80% of its thickness. This is to prevent that closing the recesses by wrapping the shaped article around an installation (as illustrated in FIG. 5a) would lead to distortion of the outer surface of the insulation. By leaving a least 20% of the thickness of the material, a round and smooth surface is obtained as shown in FIG. 5a. This is of special importance, in particular, when several layers of insulation or a final cladding (201 and 202) are applied: distortion or edges would not only compromise the optical aspect but would again implicate possible formation of gaps (203) (see FIG. 5b), which is prevented by using the shaped article (100) of the present invention.

A further aspect of the present invention is directed at a process for manufacturing the shaped article according to one of the embodiments described herein. The process comprises the steps (1) preparing a polymer composition by mixing at least the following components:
    at least one elastomeric polymer (A'),
    at least one least one crosslinkable resin (B'),
    a crosslinking agent (C), and
    an expanding agent (D);

(2) crosslinking and expanding the polymer composition to form an expanded and crosslinked elastomeric material, wherein the elastomeric materials has at least one crosslinked elastomer polymer (A) and at least one crosslinked resin (B), which form an interpenetrating network, and bringing it into a planar form with two main sides; and (3) forming a plurality of tapered recesses in one of the main sides, the tapered recesses form each a pointed angle and the sum of the pointed angles of all tapered recesses is 300 to 355 degrees and the protrusion of the recesses into the form is more than 20% but not more than 80% of the thickness of the planar form.

As elastomer polymer (A'), one, two or more of the above-mentioned elastomer polymers may be used as long as it can be crosslinked or vulcanized. It is crosslinked (vulcanized) by standard methods using common crosslinking agents or crosslinking systems, which are as such known to the skilled person for crosslinking or vulcanizing the respective elastomer polymers. The polymer composition formed in step (1) may e.g. contain a crosslinking agent or a crosslinking system (C) selected from sulphur based compounds (e.g. sulphur, thiurames, polysulphides, thiocarbamates, thioureas, thiazyls, sulphur-Si—O compounds, chlorothio-compounds etc.), peroxides, silanes, radiation or UV initiated systems, metal salts (such as MgO or ZnO) and combinations thereof.

In addition, the crosslinking agent or crosslinking system (C) or species formed during the crosslinking reaction may assist in crosslinking resin (B') to form the crosslinked resin (B).

The crosslinkable resin (B') is a reactive resin and builds next to the network of the crosslinked (vulcanized) elastomer polymer a second, resinous network (crosslinked resin (B)), so that an interpenetrating network is obtained. The crosslinked resin (B) may be a standalone network (i.e. not crosslinked with the rubber network of crosslinked elastomer polymer (A)) or it is linked to the rubber network and/or the surface of filler particles. The polymer composition can contain 1 to 100 phr, preferably 3 to 75 phr, more preferably 5 to 60 phr, of crosslinkable resin (B'), based on 100 phr of elastomer polymer (A) or (A'), respectively.

The crosslinkable resin (B') is preferably obtained from monomeric building blocks, such as urethanes, melamine, (iso)cyanurates, (meth)acrylics including esters thereof, phenolics and epoxides. Preferably, the crosslinkable resin (B') is an oligomer or a (co)polymer at least including structural units derived from one or more compounds selected from acrylic acid, acrylic acid esters, methacrylic acid and methacrylic acid esters. It may have number-average molecular weight (as determined by GPC) within the range of 1000 to $10^7$, preferably 2000 to $5\times10^6$, more preferably 3000 to $1.5\times10^6$, even more preferably 5000 to $10^6$.

The structural units of crosslinkable resin (B') include preferably units derived from at least one of (meth)acrylic acid and (meth)acrylic esters. The esters are preferably $C_{1-12}$-alkyl esters such as methyl, ethyl, propyl or butyl esters. Acrylate, ethylacrylate, methacrylate and/or methylmethacrylate are particularly preferable. The content of the units derived from at least one of (meth)acrylic acid and (meth)acrylic esters in the monomer units of the crosslinkable resin (B') is preferably 40 mol % or more, more preferably 60 mol % or more, even more preferably 80 mol % or more, especially preferably 90 mol % or more, and may be up to 100 mol %.

Optionally, the reactive resin (B') may contain structural units derived from vinylic or olefinic co-monomers, such as ethylene, vinyl chloride, vinyl(meth)acrylate, conjugated or non-conjugated dienes with 4 to 20 carbon atoms, maleic anhydride, $C_{3-14}$-alpha-olefins, $C_{6-24}$-arylvinyl (e.g. styrene), $C_{1-12}$-alkoxyvinyl or $C_{6-24}$-aryloxyvinyl. The $C_{1-12}$-alkyl group is preferably a methyl, ethyl, propyl or butyl group. The $C_{6-24}$-aryl group is preferably phenyl, tolyl or naphthyl.

As apparent, the crosslinkable resin (B') contains preferably at least an acid or ester group (COOH/R) and optionally, depending on the (co)monomers, an unsaturated bond in the main chain or a side chain thereof. These moieties act as reactive groups for the crosslinking.

For instance, the crosslinkable resin (B') may be of the general formula (a), (b) or (c)

(a)

(b)

(c)

with l indicating a number average polymerization degree of preferably 5-80, with R independently being H or methyl, with $R_n$ and $R_m$ independently being aliphatic substituents of preferably 1-12 carbon atoms or the remainder of the polymer chain, with $R_1$ being H or an aliphatic substituent of preferably 1-12 carbon atoms or an aromatic substituent of preferably 6-24 carbon atoms, and with $R_2$ being —C($R_3$)=O, wherein $R_3$ is OH or $OR_4$, wherein $R_4$ is an aliphatic substituent of preferably 1-12 carbon atoms, given the fact that at least one of the substituents $R_1$, $R_2$, $R_3$, $R_4$ essentially needs to contain an unsaturated bond and/or an $OR_x$ group acting as an active crosslinking site. Preferred are the $OR_x$ groups OH, OMe and OEt.

The polymer composition may comprises a reactive resin (B'), which is either an oligomer or polymer reacting (i.e. crosslinking) at temperatures above 120° C. or a resin, which is softening at temperatures above 80° C. Softening in the sense of the present invention means a decrease in viscosity of more than 15% at 80° C. Thus, the reactive resin (B') can be mixed with the other components of the polymer composition at elevated temperatures but below the crosslinking/vulcanization temperature (which is typically higher than 120° C.), so that a very homogenous distribution of the crosslinkable resin can be achieved. For example, the other components can be premixed and then the reactive resin (B') can be added at temperatures of 50 to 80° C., such as 70° C.

Examples for suitable crosslinkable resins (B') are "Paraloid® EXL 5136" (Dow, U.S.A.), "Fusabond® A560" (DuPont, U.S.A.) and "Elvacite® 2669" (Lucite, U.S.A.).

Crosslinking of the reactive resin (B') can be effected by condensation curing and/or ionic or radical induced (poly) addition.

The polymer composition also comprises an expansion agent or an expansion system (D), such as, but not limited to azo-compounds (e.g. azodicarbonamide), carbonates, interchalate compounds, crystal water compounds, dispersions, expanding microspheres and hollow spheres in general containing expandable gases or liquids, expanding clays and graphite and combinations thereof.

In step (1), the polymer composition may be prepared by any conventional procedure, such as by mixing the ingredients in an internal mixer or on a roller mill. The processing temperatures during the compounding (mixing) process are chosen to stay safely below the reaction temperature of a reactive resin (B') (to prevent pre-scorching), but preferably above the softening temperature of a viscosity changing resin (B') (if used) to facilitate mixing. One major advantage of many of the preferred (meth)acrylic resins is that they drop in viscosity during mixing, but then can be crosslinked at higher temperatures during crosslinking (vulcanization) of the elastomer in step (2), which typically happens at temperatures of more than 120° C.

In case additional components, such as one or more of thermoplastic polymers (E), fillers (F), further ingredients/additives (G) and fibers (H) are used, they are preferably added in step (1) to the polymer composition.

Preferably, step (1) may be a one-step mixing process.

In step (2), crosslinking and expansion is effected, preferably by heating. The components (A') and (B') will form an interpenetrating network during expansion and crosslinking leading to an elastic and flexible, but load-bearing foam. Without being bound to theory, both the crosslinking of the reactive resin (B') as well as the crystallization of the viscosity changing resin after cooling down the crosslinked and foamed elastomeric material will lead to a reinforcing, rigidity increasing effect and not negatively interfere with the elastomer network, means, the elastomeric part of the interpenetrating network will remain flexible.

The expanded and crosslinked elastomeric material is processed in a way to give a planar form, such as by molding, extrusion or calendaring, or by cutting a sheet or mat shaped material from expanded and crosslinked blocks or buns. Preferably, a one-step shaping process is used.

In step (3), the tapered recesses according to at least one of the embodiments described herein are formed, for example by milling, cutting or erosion, preferably by cutting. In case the shaped article comprises step structures and/or structures for mechanically interlocking edges of the shaped article, these structures are preferably formed using one of the aforementioned methods.

The waste from producing recesses or steps (or the entire shaped article) can be ground and again used as filler for the elastomeric material, so that no cutting waste or dust is produced.

After step (3), additional layers (I) can e.g. be connected to the shaped article if applicable.

In the process of the present invention, a major advantage is the fact that the polymer composition (components (A') and (B')) can be crosslinked by state-of-the-art, well-examined and economic methods like sulphur curing, and that co-vulcanization can be controlled by choosing the appropriate vulcanization agent or vulcanization system.

Another advantage of the process of the present invention is the fact that the preferred reactive resins (B') and the crosslinked resin (B), respectively, are neither critical concerning environmental issues nor concerning interaction with other ingredients of the elastomeric material.

Moreover, the shaped article can be produced and processed in an economic way on equipment, which is commonly used in the rubber industry, such as for mixing and shaping processes, e.g. by molding, extrusion and calendaring, as well as other shaping methods, such as cutting, milling, CNC shaping etc. It shows versatility in possibilities of manufacturing and application.

It is another advantage of the expanded and crosslinked elastomeric material that it can be given shape easily by cutting and milling, e.g. by milling/CNC machines, which is not easily feasible with standard rubbers, as they neither would give good surface nor acceptable tolerances due to their too high compressibility or they could even tear (see below, in the Examples).

A further aspect of the present invention is directed at the use of the shaped article according to one of the embodiments described herein. The shaped article is used for forming a thermal and/or acoustic insulation, acoustic and/or vibration damping, mechanical protection and/or for applications requiring load bearing.

In particular, the shaped article can be used:
for forming an insulation of a pipe, a pipe support and/or a pipe hanger,
for wrapping around pipework or a vessel,
for making prefabricated parts for equipment insulation, such as insulation shells for valves, flanges and fittings, or
for thermal and/or acoustic insulation of installations underwater, underground or underneath screed or concrete.

According to a further aspect, the present invention relates to a structure (or installation) with an insulation. The insulation is obtained or obtainable by arranging the shaped article according to at least one of the embodiments described herein around the structure, such as a pipe, a pipework, a tank or a vessel, so that the recesses are at least partially and preferably completely closed and the elastomeric material is partially compressed. The insulation may be fixed using a glue and/or male/female or "click" connections as described above.

The advantages described above for the shaped article are obtained during its use and for the structure with an insulation according to the invention. In particular, it is worthwhile noting that the low thermal conductivity and the excellent water vapor barrier properties of the elastomeric mater and the shaped article, respectively, are retained when it is partially compressed in the insulation.

In the elastomeric material of the shaped article, the rubber properties of the elastomer polymers (A), like flexibility, diffusion blocking and water repellence, are retained despite the resin (B) load. Mechanical properties like tensile strength and tear resistance are increased in comparison to the rubber compound without the resinous network.

A tough surface and the increased tensile/tear or wear properties make the shaped article also ideal for protection purposes, means, protecting sensitive materials from impact or break.

The shaped article may serve as prefabricated part for equipment insulation, including insulation shells for valves, flanges and fittings. It can be swiftly and easily composed as outlined above.

An additional advantage of the shaped article compared to standard elastomeric foams is the fact that its vibration or noise damping properties can be modified in a broad range by altering the stiffness and therefore its viscous response to sound waves.

It is another advantage of the shaped article that it is able to bear significant loads, which makes it ideal for use in applications where rigid foams are too brittle and/or too expensive and/or too difficult to apply or adapt, such as in pipe supports, pipe(line) cradles, insulation of underground and underwater installations, insulations and protective applications underneath screed or concrete etc. Further preferred applications would e.g. be distance heating and industrial insulation.

It is another advantage of the elastomeric material and the shaped article, respectively, that it is non-sag and self-supporting and therefore shows application properties superior to elastomeric foams or fiber mats that tend to sag and form gaps when being applied on horizontal pipework and that need additional support when mounted vertically to prevent warping and sagging.

EXAMPLES

For Examples 1 to 3 and Comparative Example 1, a base compound comprising 95 parts of an NBR polymer and 5 parts of an BR polymer=100 rubber parts (Nippon Zeon, Japan) (elastomer polymer (A')),
65 phr (parts per hundred parts of rubber) PVC thermoplast (Ineos, The Netherlands) (E),
170 phr aluminum trihydrate filler (Huber, U.S.A./Germany) (F),
65 phr long chain chloroparaffin plasticizer (Inovyn, U.K.) (G),
10 phr epoxydized soy bean oil plasticizer (NRC, Germany) (G),
100 phr azodicarbonaminde (Tramaco, Germany) blowing agent (D)
was mixed in a closed mixer at a temperature of 110° C. and then allowed to cool down. At 70° C., 7 phr of polymethacrylate resin (Dow, U.S.A.) (reactive resin (B')) were added and compounded homogeneously into the mixture of Examples 1 to 3 (but not for Comparative Example 1). To all mixtures (Examples 1 to 3 and Comparative Example 1), a vulcanization system (C) of ZDBC/DPTU/sulphur/ZnO was added at 110° C. in varying ratio and dosage to obtain different final densities.

The compound was extruded and vulcanized (crosslinked) on a foam extrusion line at a 120° C. to 165° C. temperature gradient. The blowing agents decomposed and caused a closed cell structure. By altering the ingredients of the vulcanization system as well as the extrusion and vulcanization oven parameters different densities were obtained. The variation in densities given below is +/−5 points. The material was cooled down to room temperature and cut to sample mats of 25 mm thickness. All materials were tested for compressibility according to EN 826 (see Table 1).

TABLE 1

Compressive strength [kPa] according to EN 826 for different densities of the elastomeric material according to the present invention (Examples 1 to 3) and Comparative Example 1.

|  | Comparative Example 1 | Example 1 | Example 2 | Example 3 |
|---|---|---|---|---|
|  | Density | | | |
|  | 55 kg/m³ | 60 kg/m³ | 95 kg/m³ | 135 kg/m³ |
| 10% compression | 5 | 15 | 19 | 22 |
| 25% compression | 11 | 59 | 72 | 78 |

The 25 mm sample mats were tried to equip with V-shaped recesses of 18 mm protrusion and a pointed angle of 12° by different methods. The results are shown in Table 2.

TABLE 2

Reaction of elastomer material of the present invention (Examples 1 to 3) and Comparative Example 1 to different methods for V-cutting (observed result; in italics: technically and optically acceptable for marketing product):

|  | Comparative Example 1 | Example 1 | Example 2 | Example 3 |
|---|---|---|---|---|
|  | Density | | | |
|  | 55 kg/m³ | 60 kg/m³ | 95 kg/m³ | 135 kg/m³ |
| Cutting by knife (manually) | Irregular walls and edges | *Irregular edges* | *Irregular edges* | *Irregular edges* |
| Cutting by knife (machine) | Fraying, irregular edges | *Good aspect* | *Good aspect* | *Good aspect* |
| Cutting by wire (machine) | Fraying | *Very good aspect* | *Very good aspect* | *Very good aspect* |
| Milling (machine) | Partially destroyed | *Good aspect* | *Very good aspect* | *Very good aspect* |

As shown in Table 2, the elastomeric material as used according to the present invention can be cut in order to produce tapered recesses. Hence, a shaped article according to the present invention is obtained. The vulcanized conventional elastomer (Comparative Example 1) is too soft (not rigid enough) and not stable enough to produce precise or at least acceptable recesses.

We claim:

1. A shaped article having a planar form with two main sides and a plurality of tapered recesses formed in one of the main sides,
    wherein the tapered recesses form each a pointed angle and the sum of the pointed angles of all tapered recesses is 300 to 355 degrees and the protrusion of the recesses into the form is more than 20% but not more than 80% of the thickness of the planar form, and
    wherein the shaped article comprises an expanded and crosslinked elastomeric material, the elastomeric material comprising at least one crosslinked elastomer polymer (A) and at least one crosslinked resin (B),
    wherein the at least one elastomer polymer (A) and the at least one resin (B) form an interpenetrating network.

2. The shaped article according to claim 1, wherein the elastomeric material contains 1 to 100 phr of the at least one resin (B), based on 100 phr of the at least one elastomeric polymer (A).

3. The shaped article according to claim 1, wherein the at least one resin (B) is a (co)polymer at least including structural units derived from one or more compounds selected from the group consisting of acrylic acid, acrylic acid esters, methacrylic acid, and methacrylic acid esters.

4. The shaped article according to claim 1, wherein the at least one elastomer polymer (A) is one or more of the group consisting of acrylic rubber (ACM/AEM), polyurethane ester/ether rubber (AU/EU), butadiene rubber (BR), bromobutyl rubber (BIIR), chlorobutyl rubber (CIIR), chlorinated polyethylene rubber (CM), polychloroprene rubber (CR), chlorosulfonated polyethylene rubber (CSM), chlorosulfonated polychloroprene rubber (CSR), ethylene oxide/epichlorohydrine rubber (G)(E)CO, ethylene propylene copolymer (EPM), ethylene propylene terpolymer (EPM/EPDM), ethylene vinyl acetate rubber (EVM), fluoro rubber (FPM/FKM), fluorocarbon (ethylene) rubber (F(E)PM), propylene oxide rubber (GPO), polyisoprene (IR), butyl rubber (IIR), silicone rubber (F)(P)(V)MQ, acrylonitrile butadiene rubber (NBR), hydrogenated acrylonitrile butadiene rubber (HNBR), natural rubber (NR), styrene butadiene rubber (SBR), styrene acrylonitrile thermoplastic rubber (SAN), styrene ethylene butadiene thermoplastic rubber (SEBS), polysulphide rubber (T), urethane thermoplastic rubber (TPU), and any mixture thereof.

5. The shaped article according to claim 1, wherein the elastomeric material has a compressive strength according to EN 826 of 45 kPa or more and less than 300 kPa at 25% compression.

6. The shaped article according to claim 1, wherein the elastomeric material has a density according to ISO 845 of less than 300 kg/m³ and a thermal conductivity according to EN 12667 of less than 0.050 W/mK at 0° C.

7. The shaped article according to claim 1, wherein the elastomeric material exhibits a water vapor diffusion barrier property according to EN 12086 of at least μ 2000.

8. The shaped article according to claim 1, wherein the shaped article has step structures on one or more of its edges to provide an overlap when mounting the shaped article and/or structures on one or more of its edges that are designed for mechanically interlocking the edges together.

9. The shaped article according to claim 1, wherein the elastomeric material is a closed or an open cell foam.

10. The shaped article according to claim 9, wherein the closed cell foam has a closed cell content of at least 70%.

11. The shaped article according to claim 1, wherein the tapered recesses have a V shape or a deformed V shape.

12. The shaped article according to claim 11, wherein the deformed V shape has at least one of the following features:
    curved side walls, and
    side walls having different angles to a plane extending perpendicularly to the plane of the planar form.

13. A process for manufacturing the shaped article according to claim 1 comprising the steps:

(1) preparing a polymer composition by mixing at least the following components:
   at least one elastomeric polymer (A'),
   at least one least one crosslinkable resin (B'),
   a crosslinking agent (C), and
   an expanding agent (D);
(2) crosslinking and expanding the polymer composition to form the expanded and crosslinked elastomeric material, wherein the elastomeric material has the at least one crosslinked elastomer polymer (A) and the at least one crosslinked resin (B), which form an interpenetrating network, and bringing it into a planar form with two main sides; and
(3) forming the plurality of tapered recesses in one of the main sides, wherein the tapered recesses form each a pointed angle and the sum of the pointed angles of all tapered recesses is 300 to 355 degrees and the protrusion of the recesses into the form is more than 20% but not more than 80% of the thickness of the planar form.

14. The process for manufacturing the shaped article according to claim 13, wherein the at least one crosslinkable resin (B') is an oligomer or (co)polymer at least including structural units derived from one or more compounds selected from the group consisting of acrylic acid, acrylic acid esters, methacrylic acid, and methacrylic acid esters.

15. A method comprising:
arranging the shaped article of claim 1 around a structure to form a thermal and/or acoustic insulation, an acoustic and/or vibration damping material, a mechanical protection material, and/or a load bearing material.

16. The method according to claim 15, further comprising:
arranging the shaped article around pipe, a pipe support, and/or a pipe hanger to form the insulation,
wrapping the shaped article around pipework or a vessel,
arranging the shaped article around valves, flanges, and/or fittings, or
arranging the shaped article around an installation underwater, underground or underneath screed or concrete to form the thermal and/or acoustic insulation.

17. A structure with an insulation comprising the shaped article of claim 1, wherein the shaped article is arranged around the structure such that the recesses are at least partially closed and the elastomeric material partially compressed.

18. The structure according to claim 17, wherein the structure is a pipe, a pipework, a tank, or a vessel.

* * * * *

UNITED STATES PATENT AND TRADEMARK OFFICE
CERTIFICATE OF CORRECTION

PATENT NO. : 10,563,810 B2
APPLICATION NO. : 16/300515
DATED : February 18, 2020
INVENTOR(S) : Georg Josef Kaimann et al.

Page 1 of 1

It is certified that error appears in the above-identified patent and that said Letters Patent is hereby corrected as shown below:

In the Claims

At Column 19, Claim 13, Line 4, the words "at least one least one crosslinkable" should read --at least one crosslinkable--

Signed and Sealed this
Nineteenth Day of May, 2020

Andrei Iancu
*Director of the United States Patent and Trademark Office*